(12) United States Patent
Krekian et al.

(10) Patent No.: US 11,186,116 B2
(45) Date of Patent: Nov. 30, 2021

(54) HEAT TRANSFER SHEET ASSEMBLY WITH IMPROVED PEELING

(71) Applicant: CCL Label, Inc., Framingham, MA (US)

(72) Inventors: Sharis Krekian, Glendale, CA (US); Gerardo Veyna, Tijuana (MX); Francisco Romano, Placentia, CA (US); Le-Hoa Hong, Temple City, CA (US); Douglas Wilson, San Dimas, CA (US); Sriram Venkatasanthanam, Chino Hills, CA (US)

(73) Assignee: CCL LABEL, INC., Framingham, MA (US)

( * ) Notice: Subject to any disclaimer, the term of this patent is extended or adjusted under 35 U.S.C. 154(b) by 0 days.

(21) Appl. No.: 15/998,732

(22) Filed: Aug. 16, 2018

(65) Prior Publication Data

US 2019/0054761 A1    Feb. 21, 2019

Related U.S. Application Data

(60) Provisional application No. 62/546,232, filed on Aug. 16, 2017.

(51) Int. Cl.
*B44C 1/17* (2006.01)
*B44C 1/16* (2006.01)
(Continued)

(52) U.S. Cl.
CPC ............... *B44C 1/172* (2013.01); *B32B 7/06* (2013.01); *B32B 27/10* (2013.01); *B32B 27/32* (2013.01);
(Continued)

(58) Field of Classification Search
CPC ..... B32B 2451/00; B32B 27/10; B32B 27/32; B32B 27/36; B32B 7/06; B44C 1/162;
(Continued)

(56) References Cited

U.S. PATENT DOCUMENTS 2,303,346 A * 12/1942 Flood .................... B31D 1/021
156/152
3,558,388 A *  1/1971 Somerville .......... G06K 19/022
156/108

(Continued)

FOREIGN PATENT DOCUMENTS

CA         3014380         2/2019

OTHER PUBLICATIONS

Search Report by STIC (Year: 2021).*

*Primary Examiner* — Sonya M Sengupta
(74) *Attorney, Agent, or Firm* — McDonald Hopkins LLC (57) ABSTRACT

A heat transfer sheet assembly and method is disclosed for improving the process of removing the carrier layer from a facestock layer. The heat transfer sheet assembly may include a heat transfer facestock layer and a carrier layer. The facestock layer may be attached to the carrier layer and include an indicia receptive surface along a side opposite the carrier layer. The carrier layer may include at least one peel line that extends from opposite edges of the assembly wherein the peel line assist to remove the carrier layer from the heat transfer facestock layer once indicia is printed on the facestock layer.

20 Claims, 10 Drawing Sheets

(51) Int. Cl.
 *B32B 7/06* (2019.01)
 *B32B 27/10* (2006.01)
 *B32B 27/32* (2006.01)
 *B32B 27/36* (2006.01)

(52) U.S. Cl.
 CPC .............. *B32B 27/36* (2013.01); *B44C 1/162* (2013.01); *B44C 1/1712* (2013.01); *B32B 2451/00* (2013.01)

(58) Field of Classification Search
 CPC .. B44C 1/1712; B44C 1/172; Y10T 156/1059
 USPC ............ 156/244.18, 252, 254, 289; 428/41.8
 See application file for complete search history.

(56) References Cited

U.S. PATENT DOCUMENTS

| | | | | |
|---|---|---|---|---|
| 4,061,808 A * | 12/1977 | Sato | ....................... | B65C 9/1865 428/42.3 |
| 4,357,192 A * | 11/1982 | Moser | ....................... | B65C 1/02 156/252 |
| 4,461,661 A * | 7/1984 | Fabel | ....................... | B42D 5/025 156/108 |
| 4,773,953 A * | 9/1988 | Hare | ....................... | A41D 27/08 156/240 |
| 5,310,589 A * | 5/1994 | Nagashima | ............ | B41M 5/035 428/32.8 |
| 5,312,645 A * | 5/1994 | Dressier | ................. | A41D 27/08 347/100 |
| 5,383,996 A * | 1/1995 | Dressier | .................. | B44C 1/162 156/230 |
| 5,419,591 A * | 5/1995 | Lambert | .............. | B42D 15/006 283/79 |
| 5,441,785 A * | 8/1995 | Liebe, Jr. | ................. | B44C 1/162 156/230 |
| 5,531,855 A * | 7/1996 | Heinecke | .............. | A61F 13/023 156/248 |
| 5,667,614 A * | 9/1997 | Stahl | ....................... | B32B 27/30 156/230 |
| 5,925,712 A * | 7/1999 | Kronzer | .................... | B41M 5/52 524/555 |
| 5,962,149 A | 10/1999 | Kronzer | | |
| 6,102,097 A * | 8/2000 | Stempien | ............. | B32B 37/0076 156/230 |
| 6,113,725 A * | 9/2000 | Kronzer | ............... | B41M 5/0355 156/230 |
| 6,450,633 B1 * | 9/2002 | Kronzer | ................... | B41M 5/52 347/105 |
| 6,811,840 B1 * | 11/2004 | Cross | .................... | B44C 1/1712 428/32.62 |
| 6,837,956 B2 * | 1/2005 | Cowell | ............. | A61F 13/15707 156/252 |
| 7,709,071 B2 * | 5/2010 | Wong | ..................... | G09F 3/0288 428/40.1 |
| RE41,649 E * | 9/2010 | Popat | ................. | B42D 15/0073 428/43 |
| 8,663,416 B2 * | 3/2014 | Dolsey | ...................... | D06Q 1/12 156/268 |
| 9,443,448 B2 * | 9/2016 | Hong | ....................... | G09F 13/08 |
| 9,505,199 B1 * | 11/2016 | Sadriwalla | .............. | D06P 5/003 |
| 10,373,529 B2 * | 8/2019 | Wong | ..................... | G11B 23/40 |
| 2001/0025687 A1 * | 10/2001 | Cross | .................... | B44C 1/1725 156/240 |
| 2004/0213943 A1 * | 10/2004 | Viby | ....................... | G09F 3/0288 428/40.1 |
| 2009/0075010 A1 * | 3/2009 | Flynn | ....................... | B32B 7/12 428/42.3 |
| 2011/0070408 A1 * | 3/2011 | Antheme | .............. | B44C 1/1712 428/172 |
| 2016/0271924 A1 * | 9/2016 | Harvill | ................. | B26F 1/3813 |
| 2017/0011210 A1 * | 1/2017 | Cheong | .............. | H04W 4/00 |
| 2017/0252221 A1 * | 9/2017 | Scopelliti | ........... | A61F 13/0259 |

\* cited by examiner

FIG. 1B
(prior art)

Scheme2: Layer Construction of Traditional Label Product

Scheme1: Layer Construction of FabricTransfer Product

| Physical Properties | Heat Transfer Facestock Material | Paper Label | PET Film Label | PP Synthetic Film Label |
|---|---|---|---|---|
| Caliper | | | | |
| Face -- mils | 4.175±0.092 | 3.650±0.046 | 2.320±0.046 | 5.078±0.031 |
| Smoothness | | | | |
| Face -- Top | 70.7±6.0 | 125.4±2.7 | 156±10 | 40.2±8.5 |
| Material Strength | Heat Transfer Facestock Material | Paper Label | PET Film Label | PP Synthetic Film Label |
| Tensile Strength | | | | |
| Youngs Modulus (Mpa) - MD | 99.9±9.6 | 5,300±1,400 | 4,690±520 | 1,200±210 |
| Load at Break (N) - MD | 3.06±0.41 | 16.5±2.0 | 20.0±4.7 | 10.6±1.3 |
| Extension at Break (inches) - MD | 1.40±0.38 | 0.034±0.014 | 0.162±0.083 | 2.7±0.9 |
| Youngs Modulus (Mpa) - CD | 116±32 | 2,280±810 | 4,420±820 | 960±130 |
| Load at Break (N) - CD | 2.94±0.53 | 7.78±0.68 | 16.7±1.2 | 8.14±0.36 |
| Extension at Break (inches) - CD | 1.08±0.42 | 0.046±0.013 | 0.197±0.074 | 0.0481±0.0079 |

FIG. 13

HEAT TRANSFER SHEET ASSEMBLY WITH IMPROVED PEELING

CROSS REFERENCE TO RELATED APPLICATIONS

This application claims priority to U.S. Provisional Patent Application No. 62/546,232 entitled "HEAT TRANSFER SHEET ASSEMBLY WITH IMPROVED PEELING" and filed on Aug. 16, 2017, which is incorporated herein by reference in its entirety.

FIELD OF INVENTION

The present disclosure generally relates to printable assembly made of heat transfer materials. More particularly, this disclosure relates to a heat transfer sheet assembly having an improved peeling process.

BACKGROUND

The decoration of fabrics or garments has been performed by utilizing various heat transfer materials and techniques. Some techniques involve printing an image on heat transfer paper or other disposable substrate and then attaching that heat transfer substrate to the garment. The images on the substrate are printed thereon with dyes or inks that have been designed to dissolve in and be retained by the fibers of the garment upon heating in a heated press. These techniques may not require industrial machinery.

One such product allows a user to print an image on the heat transfer paper in a printer located at the user's home or office and transpose that image directly on the garment by applying heat from an ironing appliance. An example of this type of product is provide by Avery Products, Inc. and sold as Avery® Dark T-shirt Transfer for Inkjet Printers. This product is designed for use with dark colored garments.

An example of a type of heat transfer paper material used as a substrate in this application may be disclosed by the following U.S. Pat. Nos. 6,450,633, 6,113,725, 5,925,712, and 5,962,149 each are incorporated by reference herein. These patents disclose materials and coatings for a heat transfer substrate such as those used in a garment transfer product.

Figure 1A:
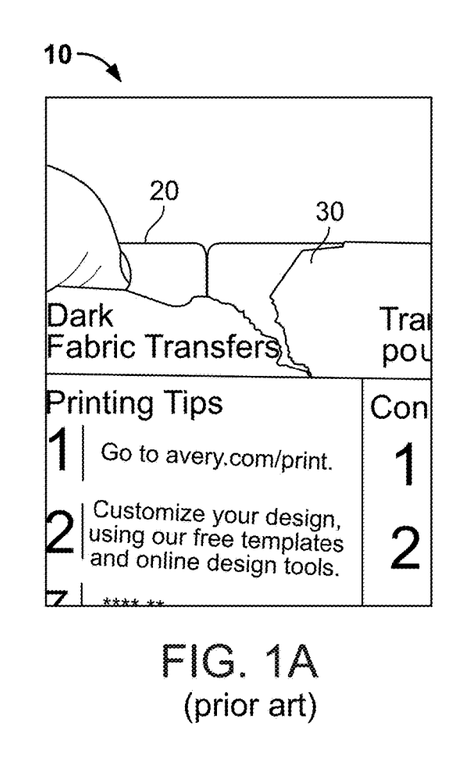
FIG. 1A is an image of an embodiment of a heat transfer sheet assembly of the prior art.
Figure 1B:
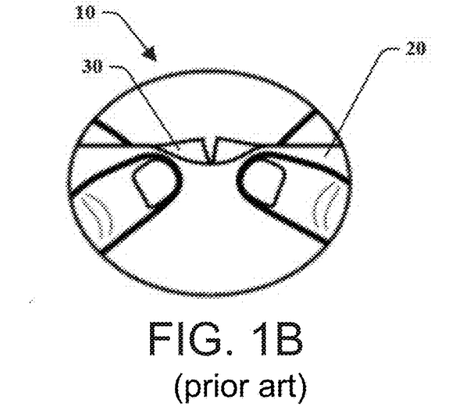
FIG. 1B is a plan view of the heat transfer sheet assembly of the FIG. 1A.

These existing products require the use of a cutting instrument or knife to cut along the perimeter of the shape of an image after it has been printed on the heat transfer material. The excess material may be removed and the liner sheet peeled away. However, these existing products do not allow for the liner sheet to be easily removed and it has caused problems for consumers. FIGS. 1A and 1B illustrate prior art embodiments of a heat transfer sheet assembly 10 wherein the liner sheet and heat transfer substrate have become deformed when attempting to be separated. Here the sheet assembly 10 that may include a heat transfer substrate layer 20 and a carrier layer 30. Thus, the image to be displayed on the garment may become warped or damaged.

Figure 1C:
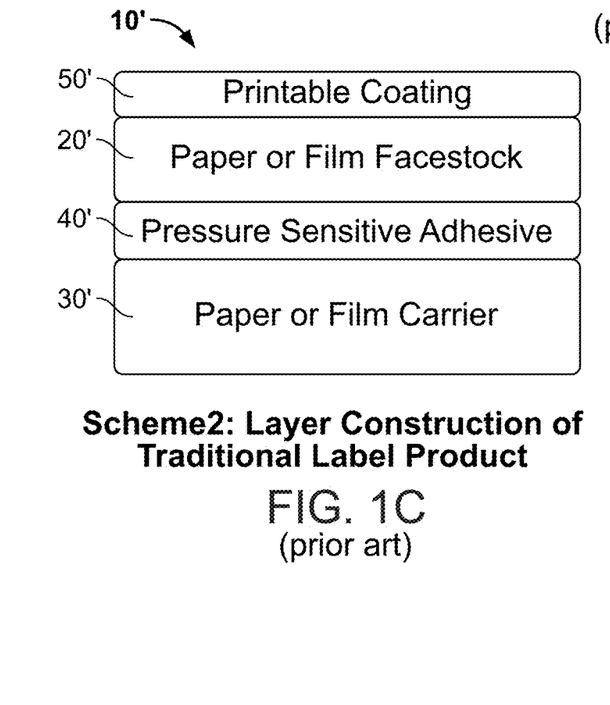
FIG. 1C is a schematic view of a various layers of a label sheet assembly of the prior art.

FIG. 1C illustrates an example of a traditional label sheet assembly 10' of the prior art. This label sheet assembly 10' is different from the heat transfer substrate 10 as it includes a layer of pressure sensitive adhesive 40' between a label facestock layer 20' and a carrier layer 30'. The label facestock layer 20 may be made of any appropriate label material, such as a paper or film material. The facestock layer 20' may have a top surface that is configured to receive indicia thereon that may include a printable coating 50'. However, the facestock layer may not be able to be adhered to a garment or to receive an applied heat to properly transfer to the garment and display the image thereon. Garments are intended to be worn by a user and washed while maintaining structural integrity.

Therefore, there is a need for an assembly having a heat transfer substrate and liner material that can be configured to reduce warping or damage to the substrate while providing an improved method of removing the liner sheet after processing the sheet assembly through a printer.

SUMMARY

A heat transfer sheet assembly is provided as shown and described herein. The heat transfer sheet assembly may include a heat transfer facestock layer and a carrier layer having at least one peel line that extends along a length of the carrier layer. A plurality of peel lines may be positioned along the carrier layer wherein the peel lines may allow a user to bend the assembly to remove portions of the carrier layer from the heat transfer facestock layer after the heat transfer sheet assembly has received indicia thereon.

In one embodiment, a heat transfer sheet assembly may include a heat transfer facestock layer without cut lines that may be configured to receive indicia thereon. The heat transfer facestock layer may include a first edge and an opposite second edge along with a third edge and an opposite fourth edge such that the edges may intersect to form a generally rectangular sheet assembly wherein the first and second edges define a feed direction such that the heat transfer sheet assembly may be configured to be fed into a conventional printer from the first edge or the second edge to receive indicia thereon. The heat transfer sheet assembly may include a carrier sheet layer attached to the heat transfer facestock layer without an adhesive layer between the carrier layer and the heat transfer facestock layer. The carrier layer may include at least one peel line positioned along the length of the carrier layer to allow a user to remove portions of the carrier layer from the heat transfer facestock layer after having received indicia thereon. The at least one peel line may extend from the first edge to the second edge. Alternatively, the at least one peel line may extend from the third edge to the fourth edge. The peel line may be generally straight cut lines or may have a wave shape as it extends along the carrier layer.

In one embodiment, the assembly includes a plurality of peel lines that may be spaced from one another along the back of the assembly. The plurality of peel lines may be generally parallel relative to each other and have a generally wavy orientation relative to the first and second edges along the feed direction of the sheet assembly.

In another embodiment, provided is a method of feeding a heat transfer sheet assembly through a printer. The method may include providing a heat transfer sheet assembly having a heat transfer facestock layer and a carrier layer. At least one peel line may be cut into the carrier layer. The heat transfer sheet assembly may be fed into a printer to print indicia thereon. In one embodiment, the peel line may assist to remove portions of the carrier layer from the heat transfer facestock layer after it received indicia thereon.

BRIEF DESCRIPTION OF THE DRAWINGS

Operation of the disclosure may be better understood by reference to the following detailed description taken in connection with the following illustrations, wherein.

DETAILED DESCRIPTION

Reference will now be made in detail to embodiments of the present disclosure, examples of which are illustrated in the accompanying drawings. It is to be understood that other embodiments may be utilized and structural and functional changes may be made without departing from the respective scope of the disclosure. Moreover, features of the various embodiments may be combined or altered without departing from the scope of the disclosure. As such, the following description is presented by way of illustration only and should not limit in any way the various alternatives and modifications that may be made to the illustrated embodiments and still be within the spirit and scope of the disclosure.

A heat transfer sheet assembly 100 is disclosed and may be of any appropriate configuration and is not limited to that shown and described herein. It should similarly be understood that the heat transfer sheet assembly 100 may be adapted to any appropriate size, including, without limitation, 8.5 inches by 11 inches, A4 size, legal size or any other size. The heat transfer sheet assembly 100 may be made of any appropriate materials and colors or indicia and this disclosure is not limited in this regard.

Figure 2:
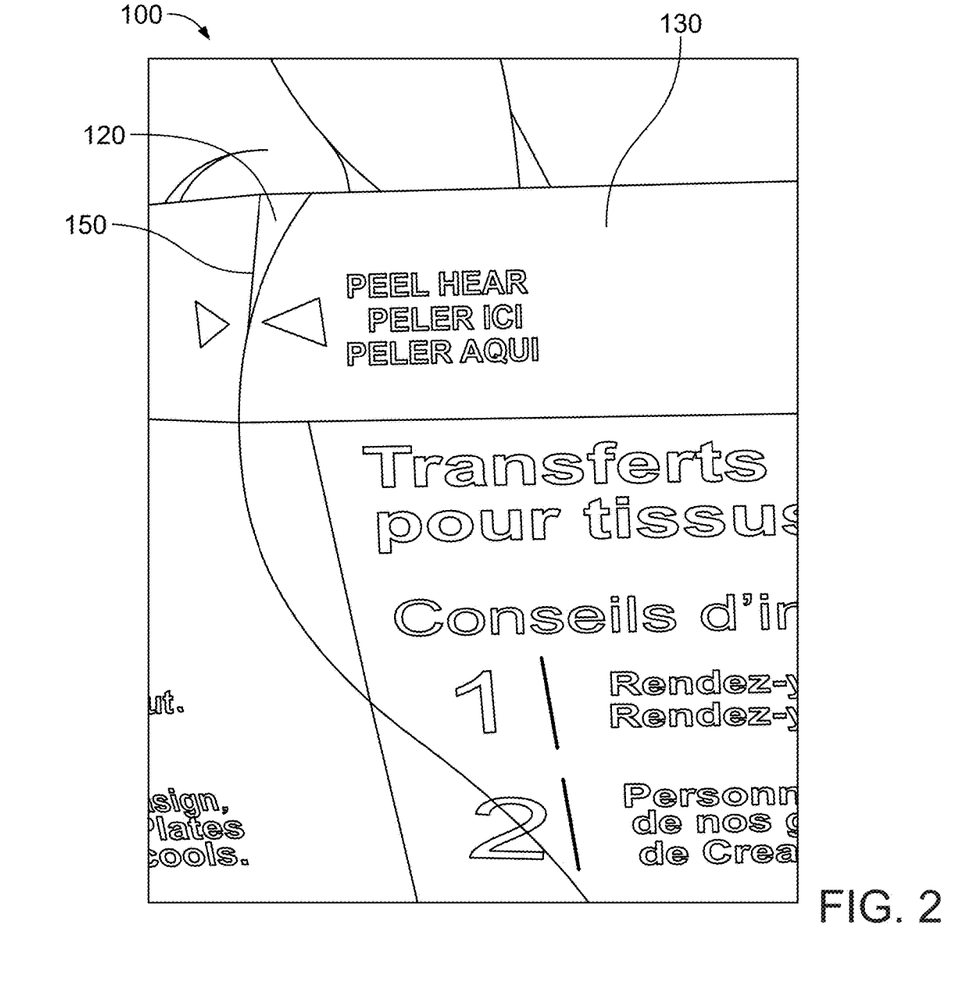
FIG. 2 is an image of an embodiment of the heat transfer sheet assembly of the present disclosure.

FIG. 2 is a plan view of a rear side view of the heat transfer sheet assembly 100 that includes a heat transfer facestock layer 120 and a carrier layer 130. The carrier layer 130 may be directly attached to the heat transfer facestock layer 120 without a layer of adhesive such as used in traditional label sheet assemblies. The carrier layer 130 may be made of any appropriate material, including, without limitation a calendared paper or polymer film. In one embodiment, the carrier layer 130 may be a base sheet that is a cellulosic nonwoven backing paper. The heat transfer facestock layer 120 may be a thermoplastic printable film layer. This layer may be an image-receptive melt-transfer flexible film layer. This layer may also include a coating thereon. Examples of appropriate substrate and coatings are identified by the following U.S. Pat. Nos. 6,450,633, 6,113,725, 5,925,712, and 5,962,149 each are incorporated by reference herein. These patents disclose substrates and coatings for a heat transfer substrate such as those used in a garment transfer product. These substrates and coatings are different from label facestock layers used in traditional label sheet assemblies such as those described by commonly owned U.S. Pat. No. 7,709,071, which is also incorporated herein by reference.

The heat transfer sheet assembly 100 is able to be fed through a printer to receive indicia thereon. The carrier layer 130 may be removed from the heat transfer facestock layer 120. A cutting instrument may be used to cut around portions of the heat transfer facestock layer 120 that did not receive indicia and those portions may be removed. The remaining portion of the heat transfer facestock layer 120 may be placed on a portion of garment with the indicia facing outwardly. A cover material may be placed over the facestock layer 120 and garment and heat may be applied thereon. Heat may be applied by various ways but a household appliance such as an iron may be used. The facestock layer 120 and indicia may then be intermeshed with the garment. Thus it is useful for fully removing the carrier layer 130 from the heat transfer facestock layer 120 prior to applying heat to intermesh the facestock layer 120 and indicia to the garment to ensure a strong attachment to the garment. Prior art versions have experienced that carrier layer fibers may remain on the facestock layer and cause an increase risk that the facestock layer and indicia may peel away from the garment either due to use or through washing the garment in a washing machine.

Figure 3A:
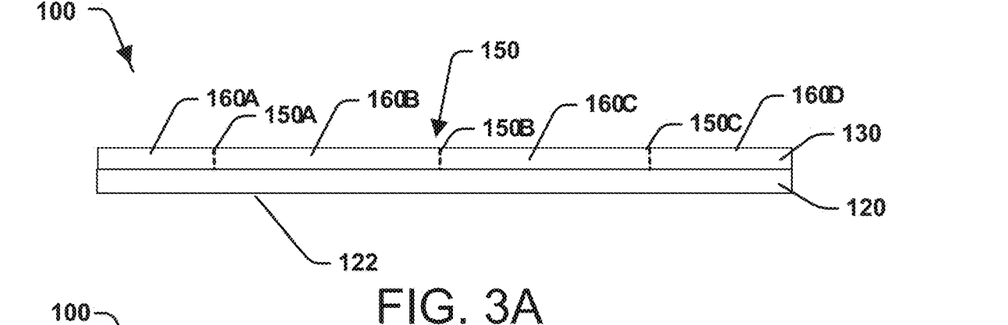
FIG. 3A is an enlarge side view of an embodiment of the heat transfer sheet assembly in accordance with an embodiment of the present disclosure.
Figure 3B:
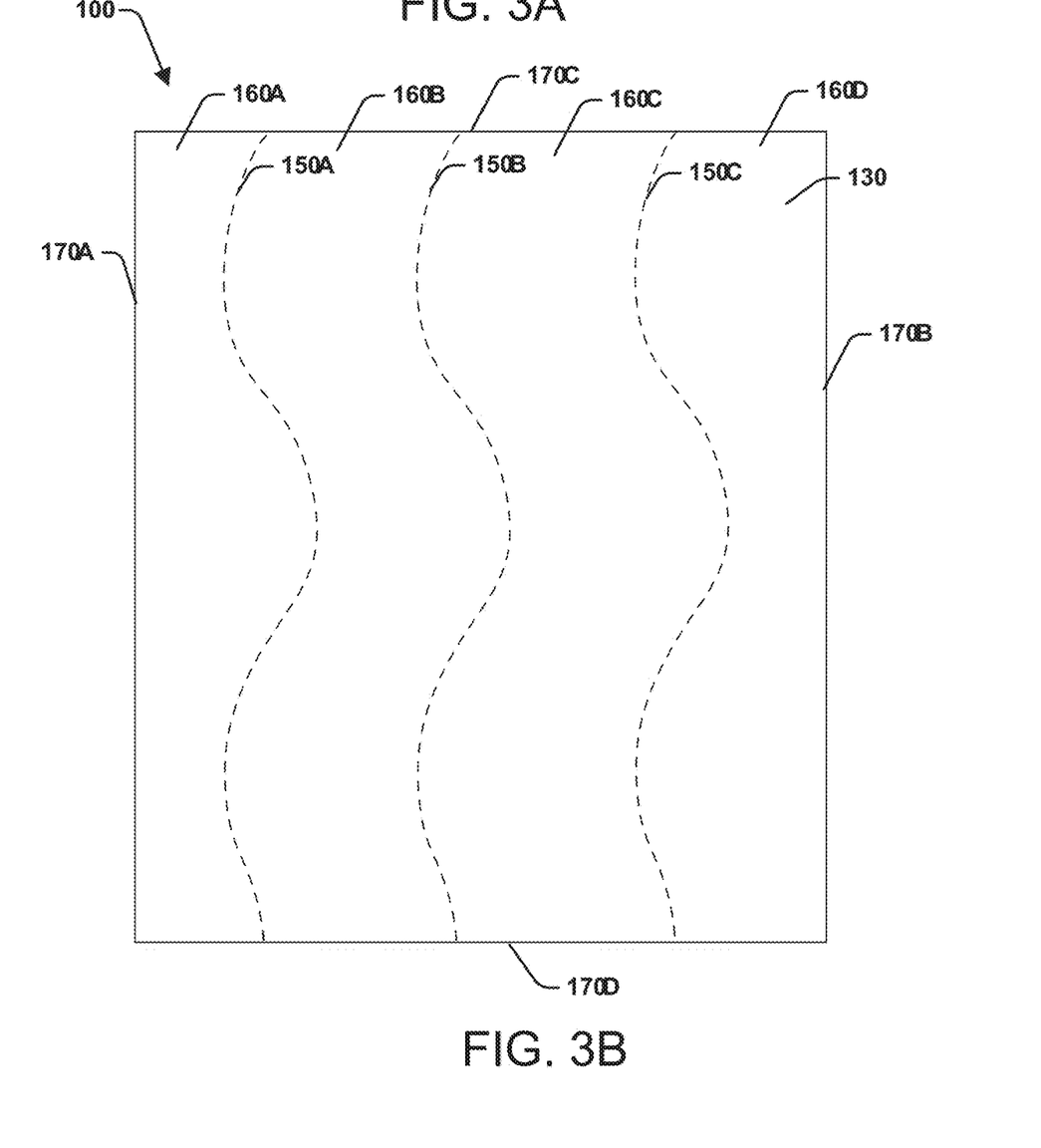
FIG. 3B is a rear plan view of the heat transfer sheet assembly of FIG. 3A.

As illustrated by FIGS. 2, 3A, and 3B, the heat transfer sheet assembly 100 may include at least one peel line 150A, 150B, 150C that may extend through the carrier layer 130 to separate the carrier layer into at least a first carrier portion 160A and a second carrier portion 160B. However, additional peel lines 150A, 150B, 150C may also separate the carrier layer 130 into additional portions, such as a third carrier portion 160C and a fourth carrier portion 160D. The heat transfer facestock layer 120 may have an indicia-receiving surface 122 that is configured to receive indicia thereon. The indicia-receiving surface 122 of the heat transfer facestock layer 120 may be opposite facing from the carrier layer 130. It is contemplated, that only a single peel line 150B may be utilized to separate the carrier layer 130 into two sections. However, this disclosure is not limited as to the number and configuration of peel lines.

In FIG. 3B, the heat transfer sheet assembly 100 may include a first edge 170A and opposite second edge 170B along with a third edge 170C and opposite fourth edge 170D. These edges 170A, 170B, 170C, and 170D may intersect to form a generally rectangular sheet assembly wherein the heat transfer sheet assembly 100 may be configured to be fed into a conventional printer from any edge.

The heat transfer sheet assembly 100 may include a plurality of peel lines 150A, 150B, 150C positioned along the carrier layer 130. In one embodiment, at least one of the peel lines 150A, 150B, 150C may extend from the first edge 170A to the second edge 170B. In another embodiment, at least one of the peel lines 150A, 150B, 150C may extend from the third edge 170C to the fourth edge 170D as illustrated by FIG. 3B. The plurality of peel lines 150A, 150B, 150C may be generally wavy cut lines and may have a generally parallel orientation relative to one another. The peel lines 150A, 150B, 150C may be spaced from the edges that it does not extend to, such as the first edge 170A and second edge 170B in FIG. 3B. The peel lines may be positioned along a feed direction of the heat transfer sheet assembly 100 to allow the heat transfer sheet assembly 100 to be fed through a printer and include enough structural integrity to receive ink or printed indicia on the indicia-receiving surface 122 thereon.

Figure 4:
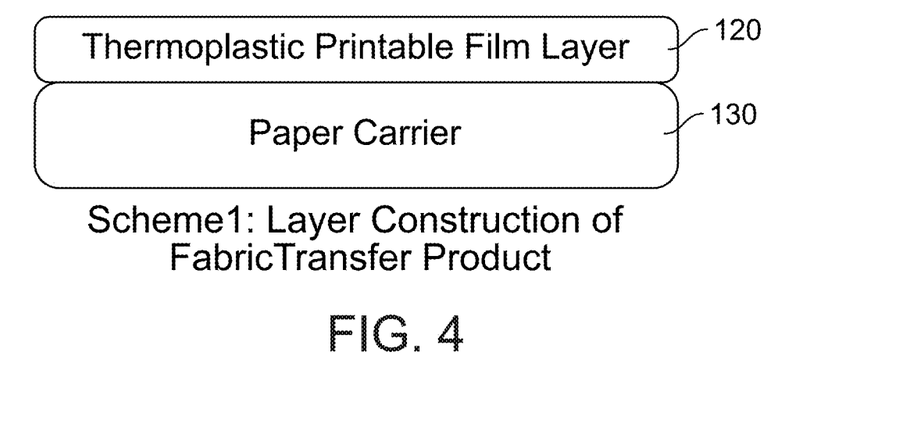
FIG. 4 is a schematic view of an embodiment of the heat transfer sheet assembly in accordance with an embodiment of the present disclosure.
Figure 5:
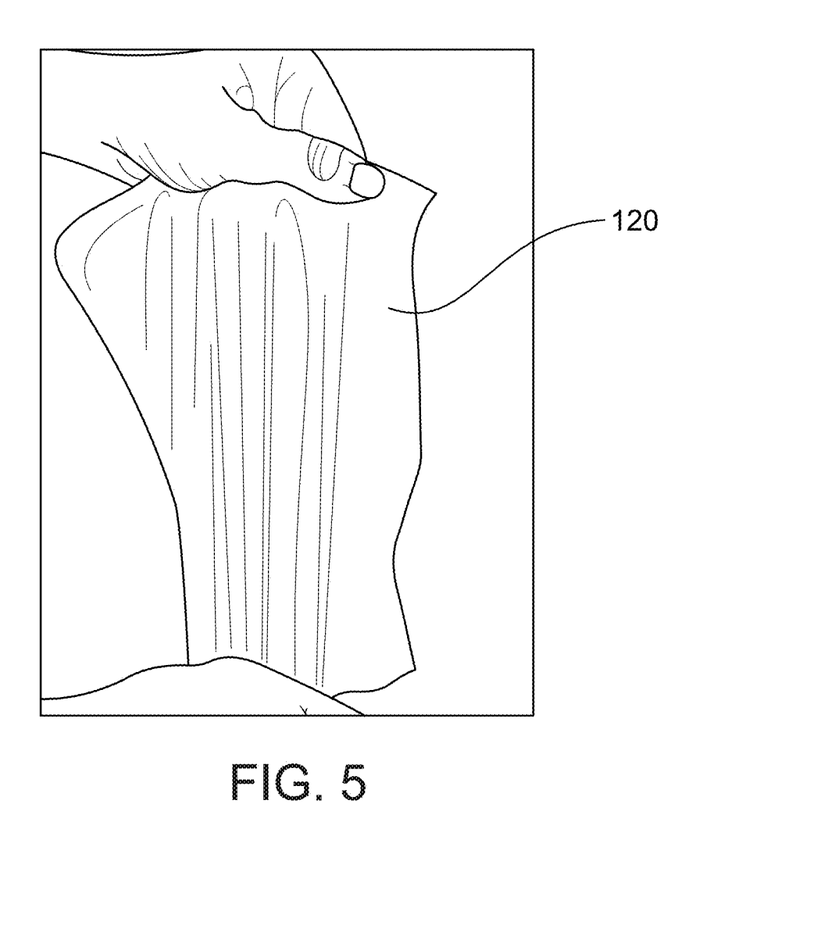
FIG. 5 is an image of a user placing tension on a thermoplastic printable film layer of the present disclosure.

Another aspect of this disclosure relates to the physical property of the heat transfer material vs. the traditional paper or film label product. Most traditional film or paper label products are designed to have certain physical properties in order to be able to convert into specific label shape/size and yet be printable with different print technologies without having a printer feeding issue, such as jamming, de-lamination and off registration. The typical label properties related to material performance and functionality includes stiffness, roughness, printable coating surface, porosity, thickness, etc. The heat transfer facestock layer 120 of the instant application is made from materials for a thermoplastic film layer. The thermoplastic film is a flexible and printable film layer that has lower tensile strength and higher elongation compare to paper or rigid film material. See FIG. 5. The flexibility of these materials and its layer construction could cause limitations in terms of printability, converting, and material performance. The heat transfer facestock layer 120 does not include an adhesive layer for attachment to the carrier layer 130 as illustrated by FIG. 4 and the facestock layer is durable and may withstand various tension forces as illustrated by FIG. 5. Moreover, the facestock layer may be more sensitive to lift off or may record marks due to pressure applied from a die cutting blade.

As such, known heat transfer facestock and liner layers have experienced difficulty being first fed through printers wherein separating the liner layer from the facestock layer has proven to be difficult without damaging the facestock layer. At least one peel line is added to improve the way in which both the heat transfer sheet assembly 100 is fed through printers to receive indicia and for allowing a user to easily remove the carrier layer 130 from the heat transfer facestock layer 120. It has been found, that at least one peal line 150 having a wavy shaped configuration has improved the printability of the heat transfer sheet assembly 100 and has reduced a risk, that the facestock layer may become separated from the garment after being intermeshed thereon.

Moreover, the heat transfer facestock layer 120 may be sensitive to heat. As a result, if the heat transfer sheet assembly 100 are stacked inside a packaging and shipped during summer season where the temperature could exceed 100° F. or even reach to up to 120° F., the material may become softer and more receptive to receiving indicia (unintended) from adjacent sheet assemblies, such as patterns from back portions of adjacent carrier layers.

In consideration of these issues, the peel lines 150 on the carrier layer 130 may be formed by a controlled die pressure, specific blade type and angled to minimize the occurrence of impressing a mark on facestock material. The peel lines 150 may be created in the carrier layer 130 by a die blade applied with controlled pressure to cut a desired distance within the carrier layer 130 without forming marks on the heat transfer facestock layer 120. The peel lines 150 may be formed as the heat transfer facestock layer 120 is attached to the carrier layer 130.

The resultant structure of the assembly may undergo stresses caused by processing the heat transfer sheet assembly 100 though the printer. The peel lines 150 may extend through the carrier layer 130. Alternatively, the peel lines 150 may extend through only a portion of the carrier layer 130 such that these cuts may be kiss cut thereon.

Figure 6:
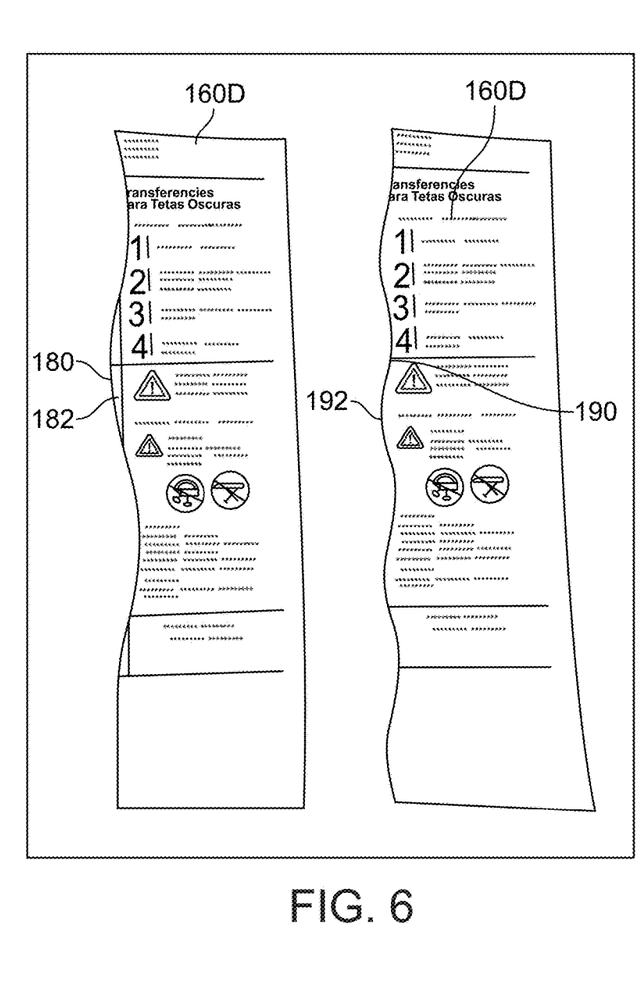
FIG. 6 is a rear view of an embodiment of a carrier layer of the heat transfer sheet assembly in accordance with an embodiment of the present disclosure.
Figure 7:
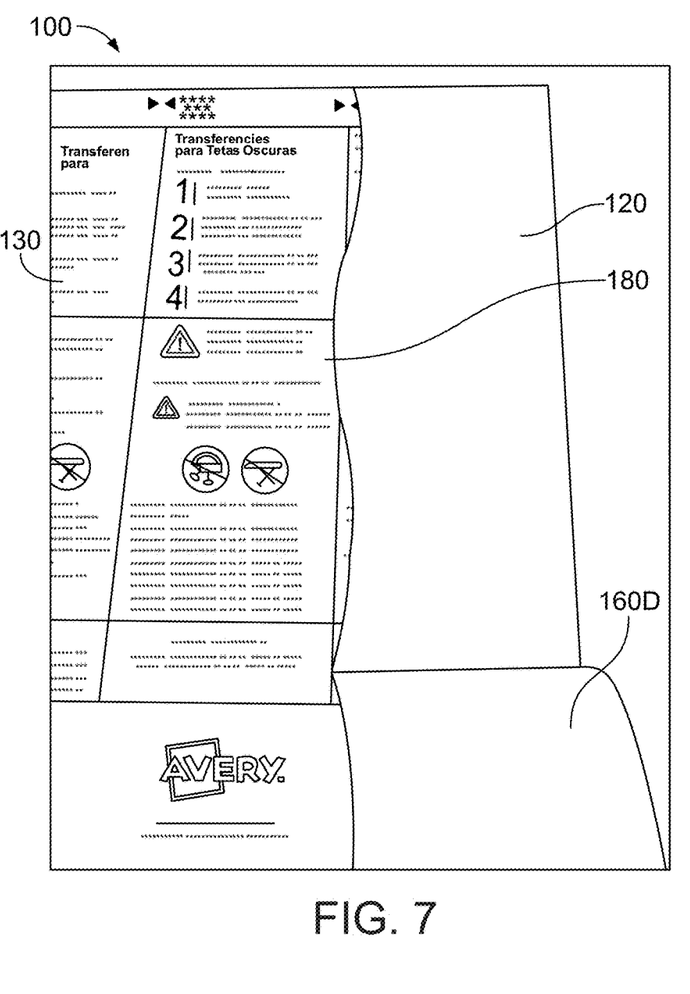
FIG. 7 is a rear view of an embodiment of the heat transfer sheet assembly in accordance with an embodiment of the present disclosure.
Figure 8:
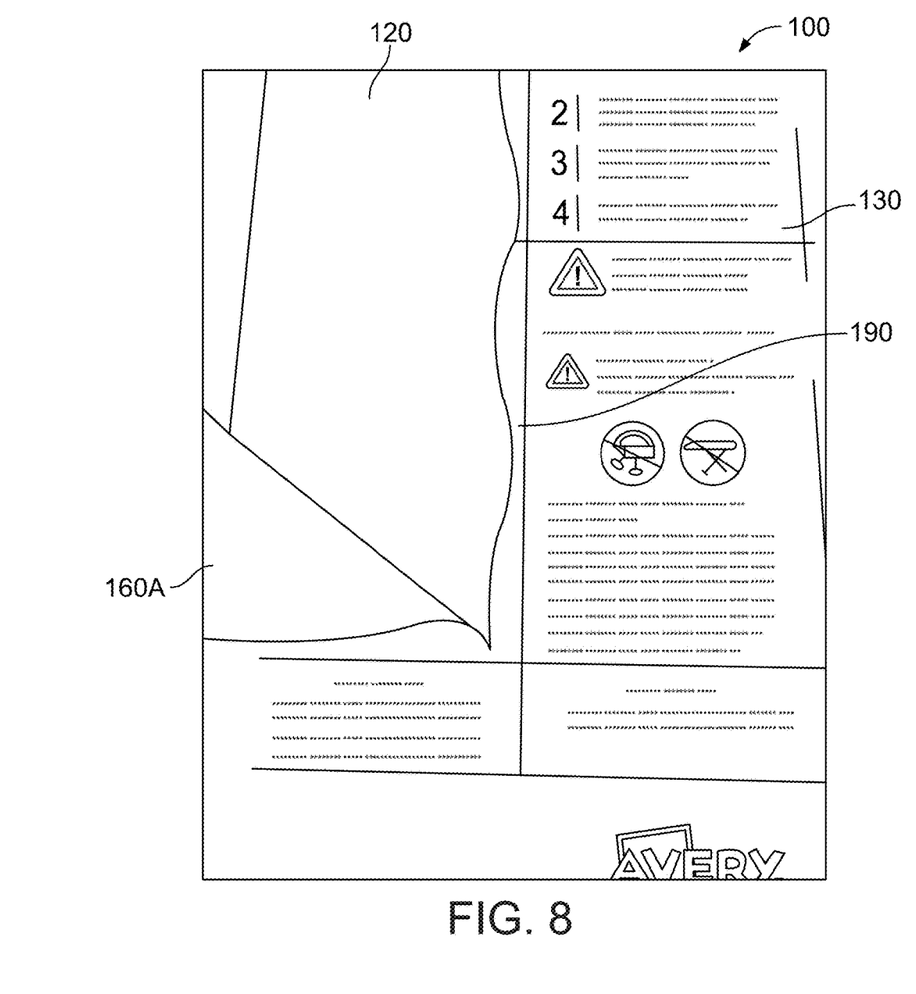
FIG. 8 is a rear view of an embodiment of the heat transfer sheet assembly in accordance with an embodiment of the present disclosure.

In one embodiment, the peel lines 150 may be formed in an elongated wave form 180 or as a short wave form 190 as illustrated by FIG. 6. Here carrier portions are provided after having been removed from the heat transfer facestock layer 120 to illustrate the shapes of the peel lines 150. FIG. 7 illustrates the ease in which the carrier portion 160D of the carrier layer 130 having the elongated wave form 180 may be removed from the heat transfer facestock layer 120. The elongated wave form 180 is wider than the short wave form 190 and includes a lower number of arches 182 or peaks. As such, the carrier layer 130 tends to be removed and peeled off cleanly. FIG. 8 illustrates the ease in which the carrier portion 160A of the carrier layer 130 having the short wave form 190 may be removed from the heat transfer facestock layer 120. The short wave form 190 includes multiple smaller arches 192 or peaks than the elongated wave form 180. In each instance, the peel lines may allow the user to peel the carrier portions lengthwise from the heat transfer facestock layer 120. The lengthwise direction may be considered vertical or along a machine direction/feed direction.

Figure 9:
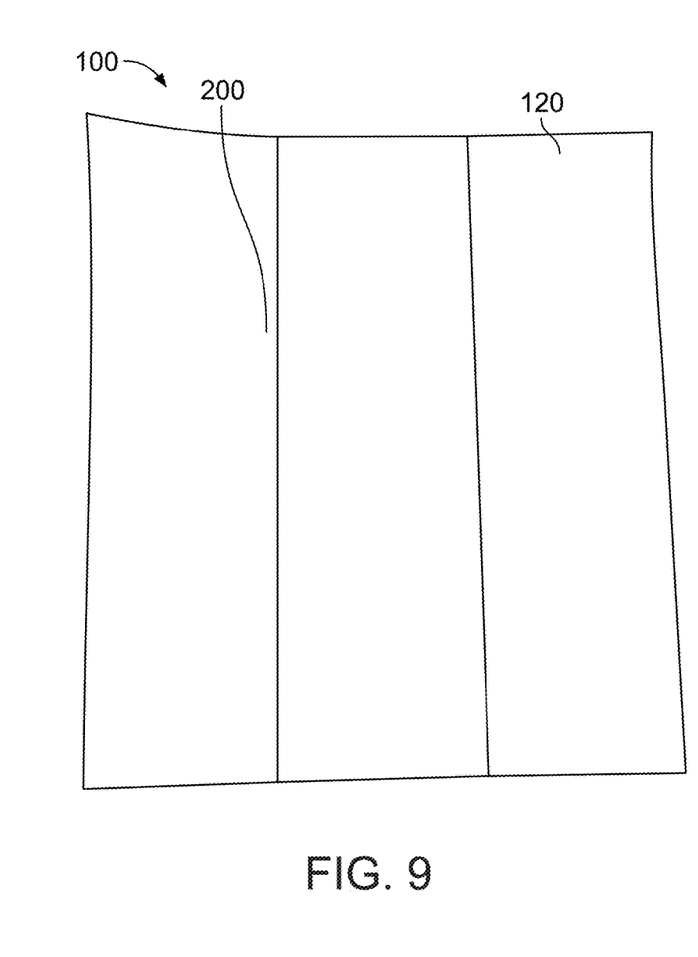
FIG. 9 is a front view of an embodiment of the heat transfer sheet assembly in accordance with an embodiment of the present disclosure.
Figure 10:
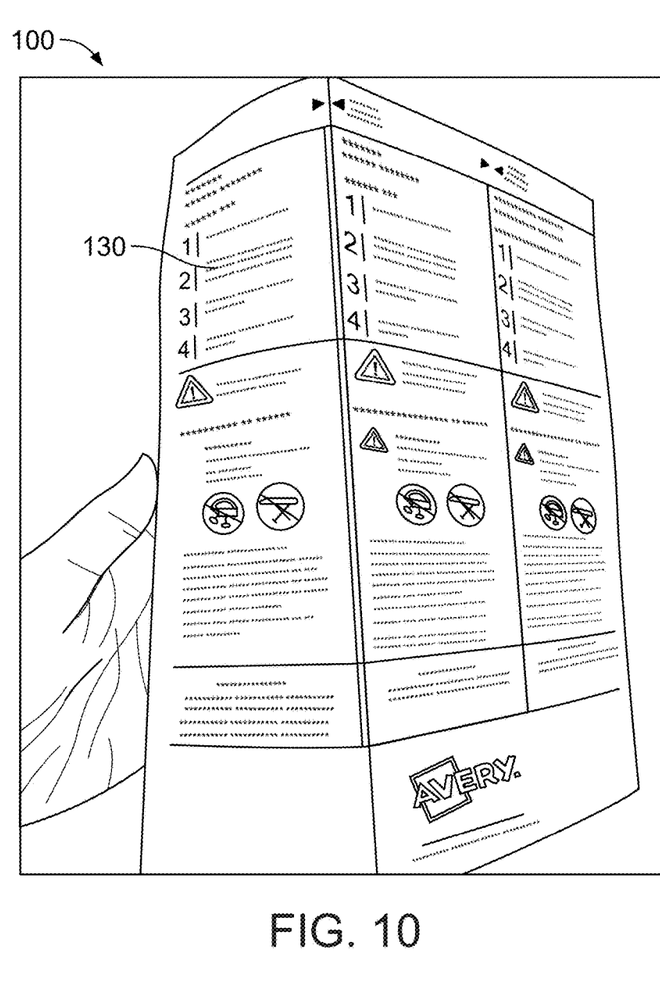
FIG. 10 is a rear view of an embodiment of the heat transfer sheet assembly of FIG. 9 in accordance with an embodiment of the present disclosure.

In another embodiment, the peel lines 150 may be formed in a straight form 200 as illustrated by FIGS. 9 and 10. FIG. 9 illustrates the image receiving front portion of the heat transfer facestock layer 120 having bent creases thereon and FIG. 10 illustrate the back portion of the carrier layer 130 with the straight form 200 type peel lines 150 in which the carrier portions 160A, 160B, and 160C of the carrier layer 130 may be bent relative one another to be removed from the heat transfer facestock layer 120. Notably, the straight form 200 type peel lines 150 may increase a risk of leaving marks on the sheet assembly due to the folding behavior.

Figure 11:
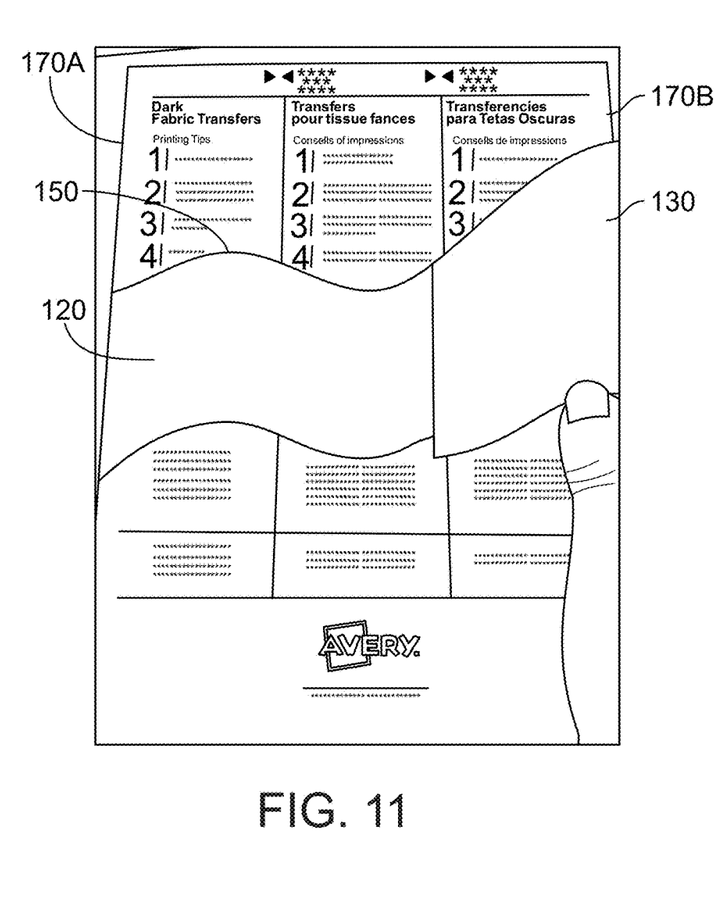
FIG. 11 is a rear view of an embodiment of the heat transfer sheet assembly in accordance with an embodiment of the present disclosure.
Figure 12:
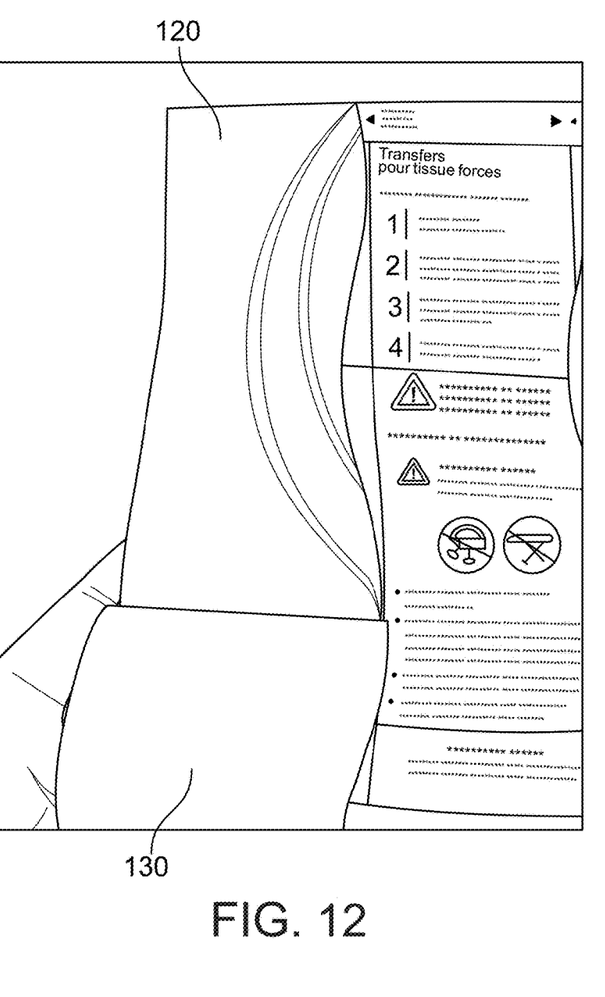
FIG. 12 is a rear view of an embodiment of the heat transfer sheet assembly in accordance with an embodiment of the present disclosure.

FIG. 11 illustrates another embodiment in which the peel lines 150 extend along the carrier layer 130 from the first edge 170A to the second edge 170B. Here the peel lines 150 may have an elongated or shorten wave form and allows the user to peel the carrier portions widthwise from the heat transfer facestock layer 120. The widthwise direction may be considered horizontal or along a cross direction.

In one embodiment, the first and second edges 170A, 170B may include a length that is between approximately 7 inches and 18 inches, or more narrowly between approximately 11 inches and 14 inches. The third and fourth edges 170C, 170D may include a length that is between approximately 5 inches and 11 inches, or may be approximately 8.5 inches. Alternately, the dimensions of the heat transfer sheet assembly 100 may include dimensions that compare to standard U.S. paper sizes including letter (8.5×11 in), legal (8.5×14 in), junior legal (5×8 in), and ledger/tabloid (11×17 in) sizes or standard international paper sizes such as A, B, and C paper sizes.

Figure 13:
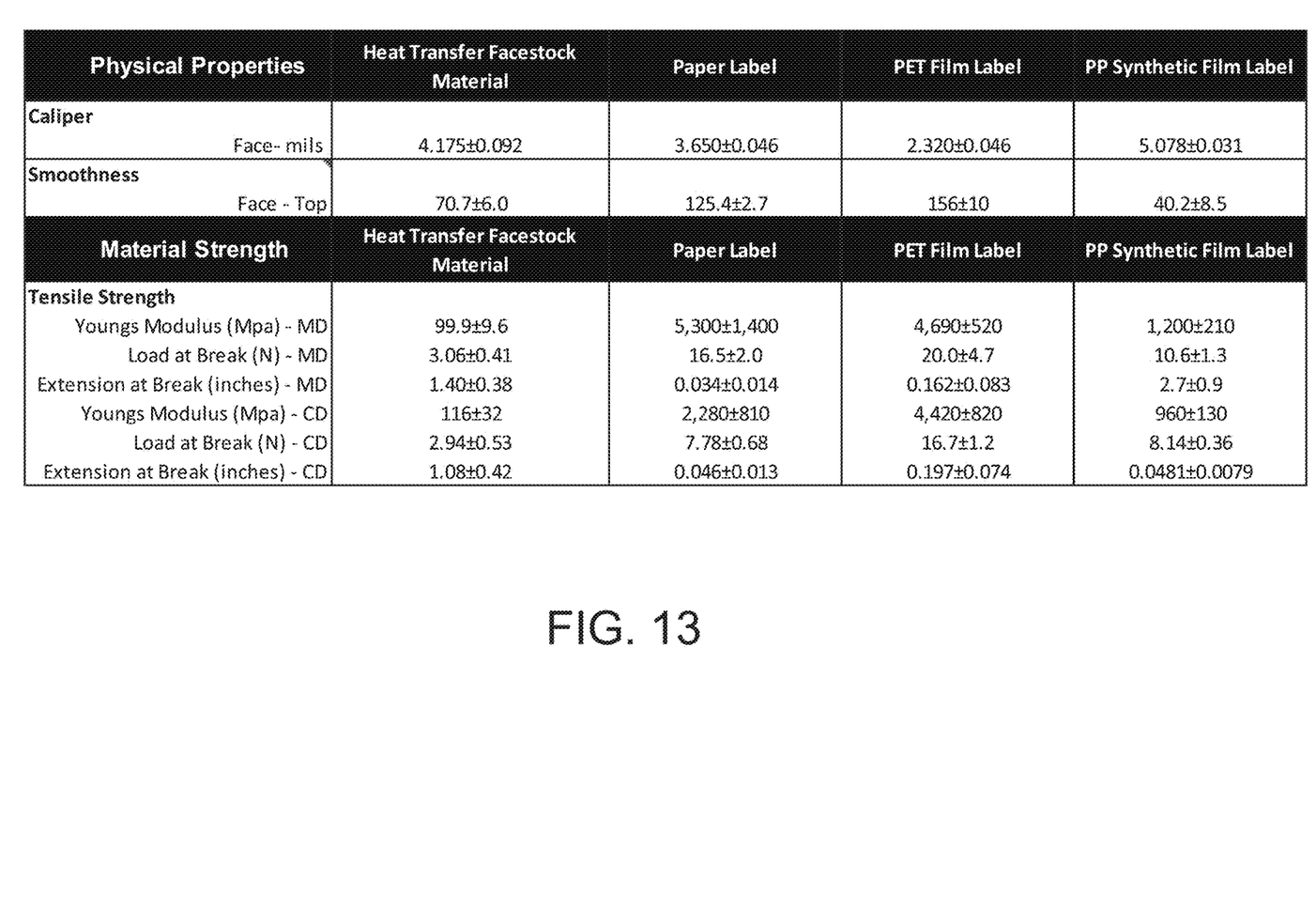
FIG. 13 is a table of various measurements of substrates of various types of sheet assemblies.

FIG. 13 is a table that illustrates a comparison of heat transfer facestock material vs. traditional paper type label facestock material and other types of film labels. The first column lists different physical properties of the material including caliper, smoothness, and material strength. The second column identifies the values for the heat transfer facestock material of the instant application. The third column identifies the material values of a traditional paper label sheet. The fourth column identifies material values of a PET film label material. The fifth column identifies material values of a polypropylene synthetic film label material. The heat transfer facestock material includes measurable physical properties and material strength that are distinguishable from the identified traditional label sheet assembly materials.

Figure 14:
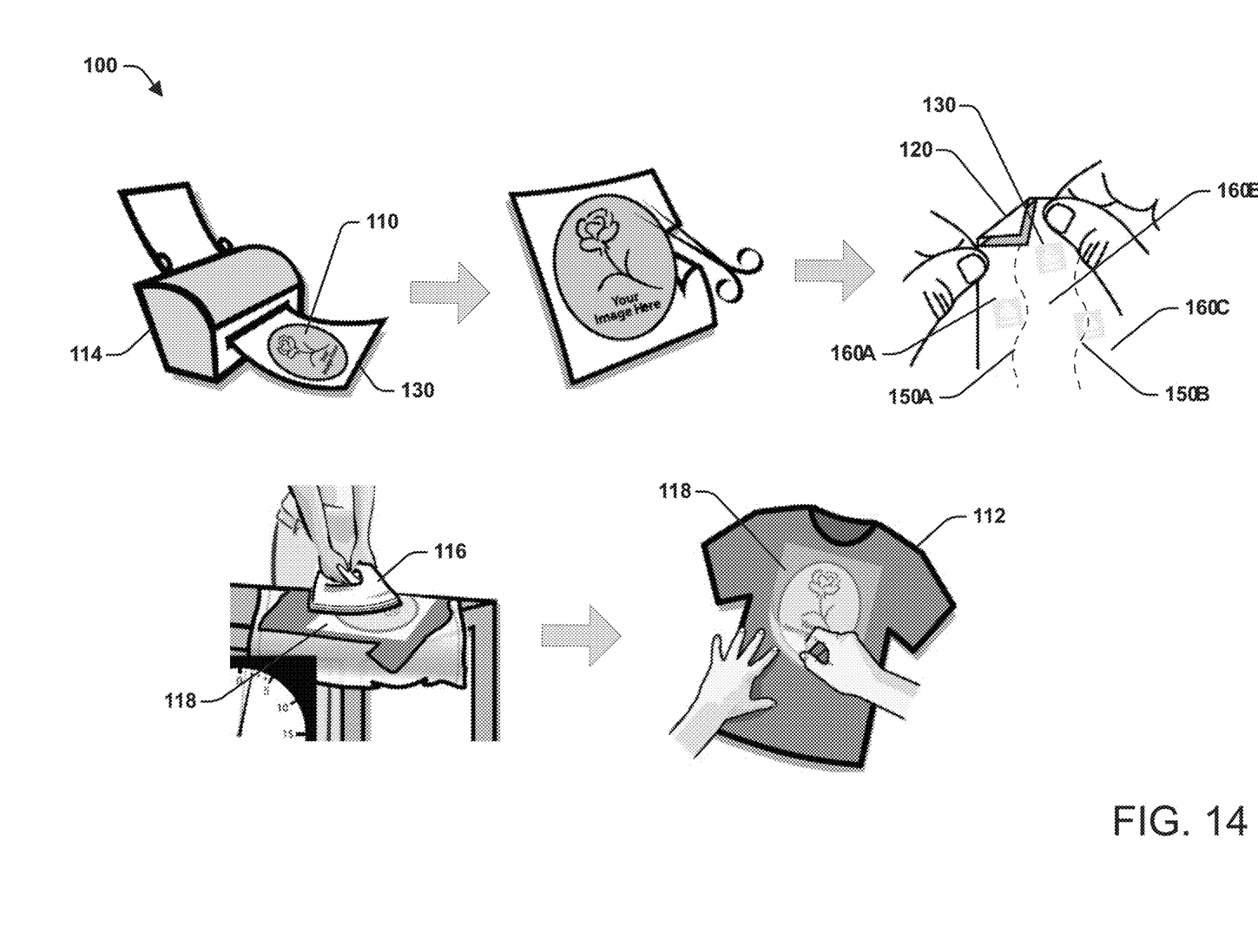
FIG. 14 is a schematic illustration of a method of application of the heat transfer sheet assembly in accordance with an embodiment of the present disclosure.

As best shown in FIG. 14, illustrated is a method of applying the heat transfer sheet assembly 100 to an article 112 such as a garment for placing an indicia 110 thereon. This method comprises the steps of: generating indicia 110 such as a design or arrangement of letters and numbers in any form or fashion and providing the indicia 110 to a printer 114. Providing the heat transfer sheet assembly 100 having a heat transfer facestock layer 120 and a carrier layer 130 in the printer 114. Printing the indicia 110 by the printer 114 onto the indicia-receiving surface 122 of the heat transfer facestock layer 120. In such embodiment, the indicia-receiving surface 122 of the heat transfer facestock layer 120 may be configured to receive the indicia 110 thereon.

After printing the indicia 110 on the facestock portion, the carrier portions 160 may be peeled or removed from the heat transfer facestock layer 120 such that the carrier layer 130 is not attached to the facestock. In this particular embodiment, the method may include peeling off the carrier portions 160A, 160B, 160C of the carrier layer 130 from the heat transfer facestock layer 120 along at least one peel line. The at least one peel line may include a first peel line 150A and a second peel line 150B in the carrier layer 130. In such embodiment, the carrier layer 130 may be configured to separate along the plurality of peel lines 150A, 150B or only one such peel line. In such embodiment, the plurality of peel lines 150A, 150B may assists to remove carrier portions 160A, 160B, 160C of the carrier layer 130 from the heat transfer facestock layer 120 after it receives the indicia 110 thereon.

The user may optionally cut out or modify the shape of the facestock layer and associated indicia 110 printed thereon. In one embodiment, the user may cut along the perimeter of the shape of the indicia 110 after it has been printed on the heat transfer facestock layer 120. In this embodiment, the excess material/portion of the heat transfer facestock layer 120 may be removed. The optional cutting may be performed before the carrier layer 130 has been removed from the facestock layer or it may be performed after the carrier layer 130 has been removed from the facestock layer.

The remaining portion of the heat transfer facestock layer 120 may be placed on a portion of the article with the indicia facing outwardly from the article. A non-stick or tack-free overlay support 118 may be provided (e.g. ironing tissue or fabric) over the article 112 such as a garment. Heat 116 may be applied to the heat transfer facestock layer 120 having the indicia 110 thereon through the overlay support 118 to intermesh the facestock layer 120 with indicia to the article 112. The method generally includes heating the heat transfer facestock layer 120 with indicia 110 to a particular temperature relatively quickly and generally directly. The heat 116 may be applied in various ways, by way of non-limiting example, a household appliance such as an iron may be used. Additionally, this particular application may take place in the absence of steam. The article 112 may then be cooled by removing the heat from the article to allow the facestock layer 120 and indicia 110 intermeshed with the article to cool for appropriate period of time. Depending upon the particular application, the post heating treatment methods may also enable one or more preheating operations to be eliminated. For indicia including heat shrink materials, the preferred post application heating is performed after heat shrinking of the indicia. The overlay support 118 may be removed from the article 112 with the indicia 110 thereon.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The features of each embodiment described and shown herein may be combined with the features of the other embodiments described herein. The claims as follows are intended to include all modifications and alterations insofar as they come within the scope of the claims or the equivalent thereof.

We claim:

1. A heat transfer sheet assembly comprising:
  a heat transfer facestock layer including a first side to receive indicia thereon;
  a carrier layer attached to the heat transfer facestock layer opposite from the first side; and
  at least one peel line positioned along the carrier layer wherein the peel line allows a portion of the carrier layer to be removed from the heat transfer facestock layer after receiving indicia from a printer wherein said at least one peel line is formed in the carrier layer as the heat transfer facestock layer is attached to the carrier layer.

2. The heat transfer sheet assembly according to claim 1, wherein the heat transfer facestock layer and the carrier layer share a plurality of edges and include a plurality of peel lines, the plurality of peel lines being generally parallel relative to each other and having a generally wavy shape relative to the plurality of edges along a feed direction of the sheet assembly.

3. A heat transfer sheet assembly comprising:
  a heat transfer facestock layer for receiving indicia thereon, the facestock layer includes a first edge with an opposite second edge, and a third edge with an opposite fourth edge such that the edges intersect to form a generally rectangular sheet assembly wherein the third and fourth edges define a feed direction such that the heat transfer sheet assembly is configured to be fed into a printer from the first edge or the second edge,
  a carrier layer is attached to the heat transfer facestock layer without an adhesive layer between the carrier layer and the heat transfer facestock layer; and
  at least one peel line positioned along the carrier layer to allow at least one portion of the carrier layer to be removed from the heat transfer facestock layer after receiving indicia thereon.

4. The heat transfer sheet assembly according to claim 3, wherein the at least one peel line extends from the first edge to the second edge.

5. The heat transfer sheet assembly according to claim 3, wherein the at least one peel line extends from the third edge to the fourth edge.

6. The heat transfer sheet assembly according to claim 3, wherein the at least one peel line is a generally straight cut line.

7. The heat transfer sheet assembly according to claim 3, wherein the at least one peel line has an elongated wave form.

8. The heat transfer sheet assembly according to claim 3, wherein the at least one peel line has a short wave form.

9. The heat transfer sheet assembly according to claim 3, wherein the at least one peel line includes a plurality of peel lines that are generally parallel relative to one another along the feed direction of the sheet assembly.

10. A method of manufacturing a heat transfer sheet assembly comprising:
   providing a heat transfer sheet assembly having a heat transfer facestock layer and a carrier layer;
   cutting at least one peel line into the carrier layer such that the heat transfer sheet assembly may be fed into a printer to print indicia thereon;
   wherein the peel line assists to remove portions of the carrier layer from the heat transfer facestock layer after it receives indicia thereon.

11. The method of claim 10, further comprising cutting the at least one peel line into the carrier layer along a feed direction of the heat transfer sheet assembly.

12. The method of claim 10, further comprising cutting the at least one peel line into the carrier layer along an axis perpendicular to a feed direction of the heat transfer sheet assembly.

13. A method of applying a heat transfer sheet assembly to an article, comprising:
   generating an indicia;
   providing a heat transfer sheet assembly having a heat transfer facestock layer and a carrier layer at a printer;
   printing by the printer the indicia onto an indicia-receiving surface of the heat transfer facestock layer;
   separating carrier portions along at least one peel line of the carrier layer to remove the carrier layer from the heat transfer facestock layer;
   placing the heat transfer facestock layer on an article with the indicia-receiving surface facing outwardly therefrom; and
   applying heat to the heat transfer facestock layer placed on the article to intermesh the heat transfer facestock layer and indicia to the article.

14. The method of claim 13, further comprising cutting along a perimeter of a shape of the indicia after the indicia has been printed on the heat transfer facestock layer.

15. The method of claim 13, further comprising placing an overlay support over the heat transfer facestock layer having the indicia thereon and providing heat through the overlay support to intermesh the facestock layer with indicia to the article.

16. The method of claim 12, further comprising providing an overlay support over the heat transfer facestock layer after separating carrier portions along at least one peel line of the carrier layer.

17. The method of claim 12, further comprising separating carrier portions along a feed direction of the heat transfer sheet assembly.

18. The method of claim 12, further comprising separating carrier portions along at least one peel line of the carrier layer having at least one peel line with an elongated wave form.

19. The method of claim 12, further comprising separating carrier portions along at least one peel line of the carrier layer having at least one peel line with a short wave form.

20. The heat transfer sheet assembly according to claim 1, wherein said at least one peel line is formed as a generally wavy shape relative to the plurality of edges.

* * * * *